United States Patent [19]

Lyons

[11] Patent Number: 5,218,879
[45] Date of Patent: Jun. 15, 1993

[54] LOST MOTION DRIVE ASSEMBLY
[75] Inventor: Rick D. Lyons, Winona, Minn.
[73] Assignee: Lake Center Industries, Inc., Winona, Minn.
[21] Appl. No.: 753,722
[22] Filed: Sep. 30, 1991
[51] Int. Cl.[5] .............................................. G05G 9/00
[52] U.S. Cl. ............................... 74/471 R; 74/480 R; 74/553; 74/483 R; 192/108; 192/109 R
[58] Field of Search ................ 74/471 R, 480 R, 553, 74/483 R; 192/108, 109 R, 67 R; 454/69

[56]         References Cited
         U.S. PATENT DOCUMENTS

| | | | |
|---|---|---|---|
| 2,542,145 | 2/1951 | Kehle | 74/471 |
| 2,985,268 | 5/1961 | Morse | 74/480 |
| 3,355,960 | 12/1967 | Bureek et al. | 74/471 |
| 3,703,836 | 11/1972 | Kiser | 74/471 R |
| 4,078,446 | 3/1978 | Baba | 74/471 R |
| 4,226,138 | 10/1980 | Ha-Pham | 74/471 R |
| 4,656,926 | 4/1987 | Bauer et al. | 74/553 X |

Primary Examiner—Richard M. Lorence
Assistant Examiner—Benjamin Levi
Attorney, Agent, or Firm—Kinzer, Plyer, Dorn, McEachran & Jambor

[57] ABSTRACT

A lost motion drive assembly has a base mounting upper and lower levers which connect to the louvers of an air plenum, such as in an automobile's ventilation system. A user turns a knob between a plurality of selections, causing a gear-operated actuator to rotate. A clutch mechanism operable between the actuator and levers engages the lower lever to drive it one way in response to rotation of the knob. Upon continued rotation of the knob, a drive lug on the actuator engages the upper lever to drive it the same way while the clutch disengages from the actuator and holds the lower lever fixed. Reverse motion is obtained when the clutch engages the actuator and upper lever, after which it releases the actuator and a second drive lug engages the lower lever to return it to its starting position.

24 Claims, 5 Drawing Sheets

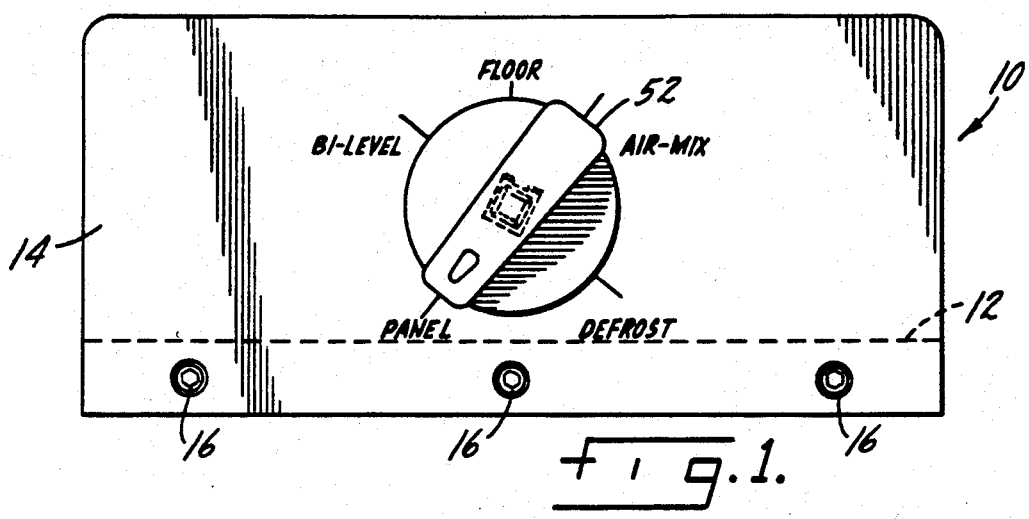
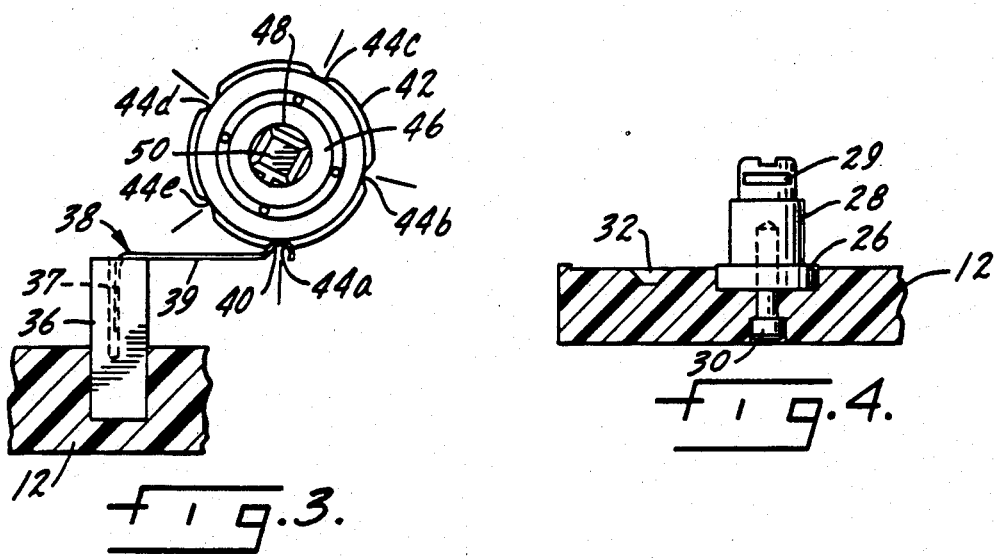
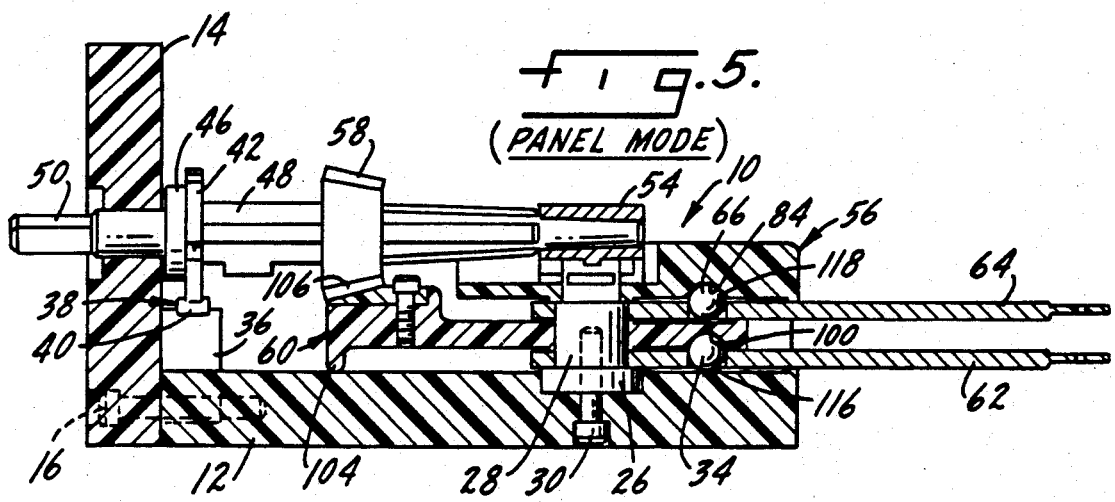

(PANEL MODE)

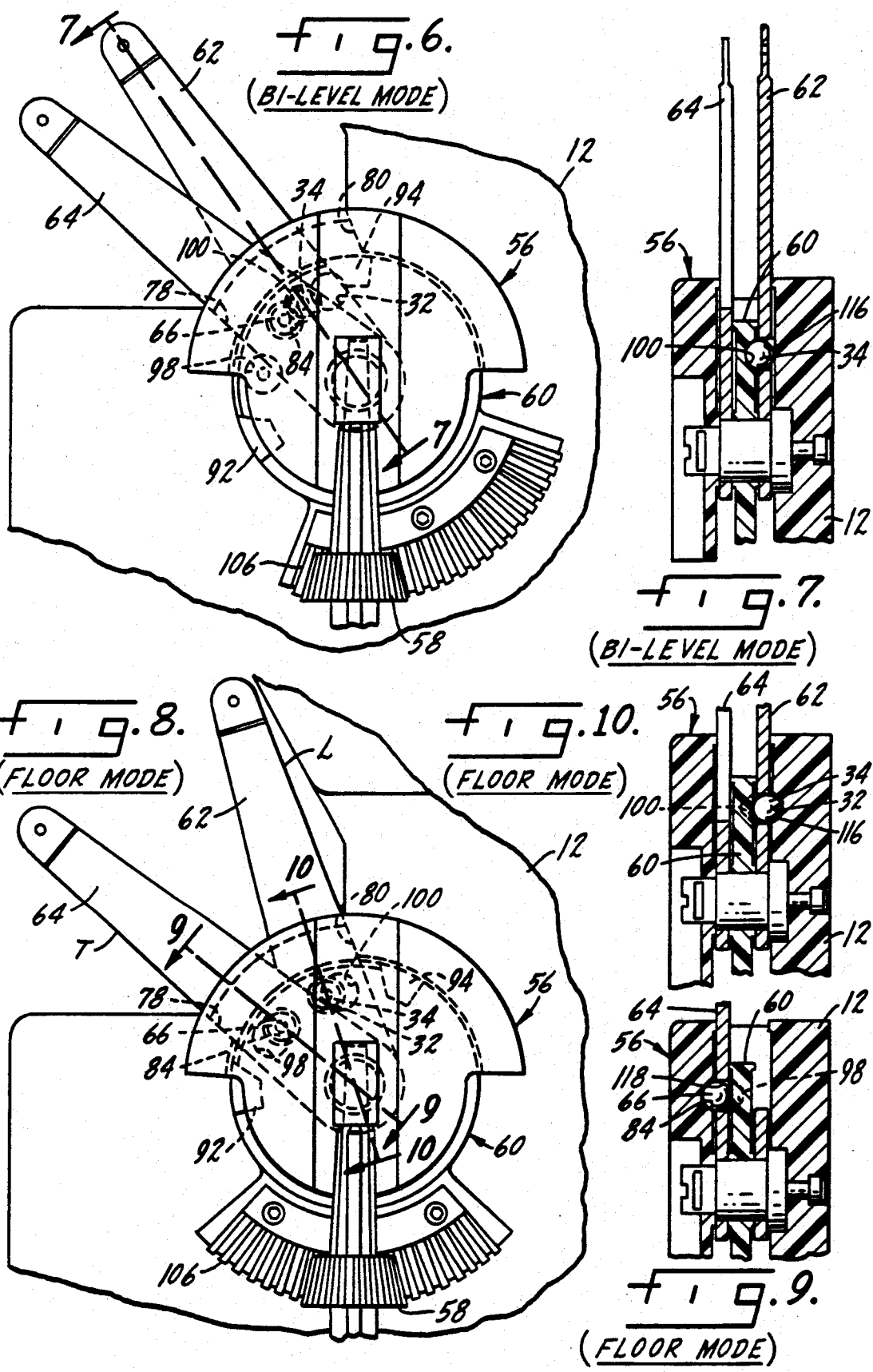

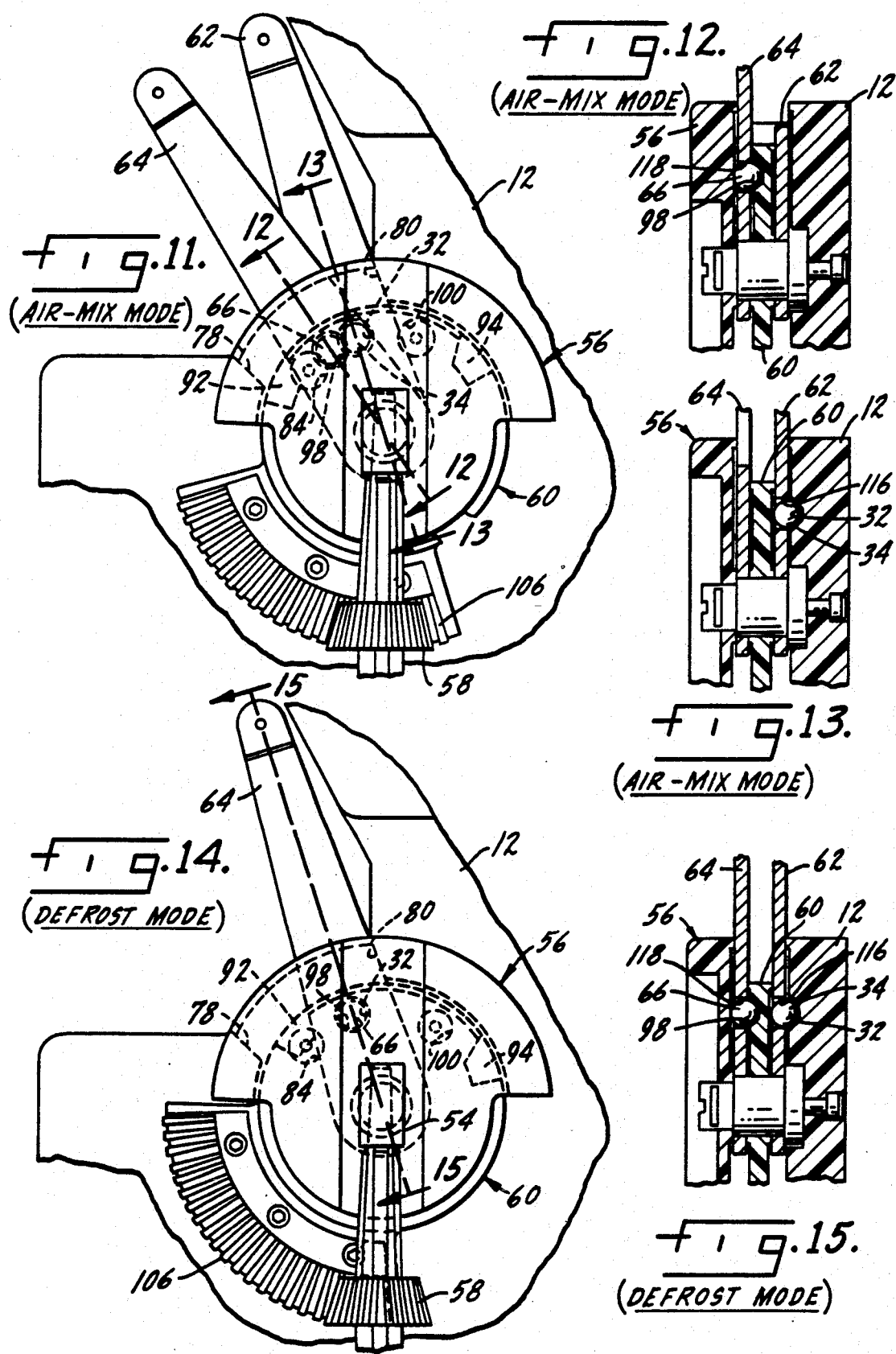

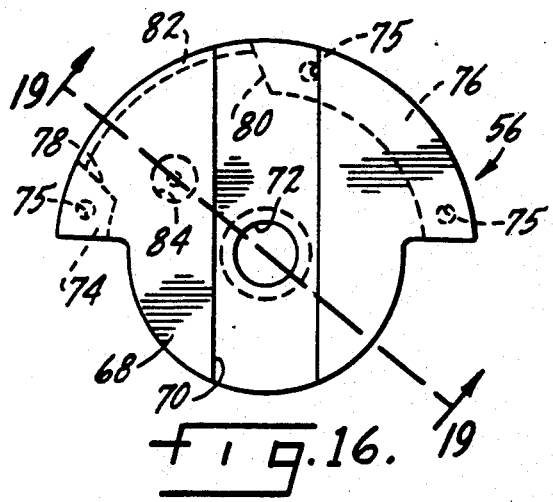
fig.16.
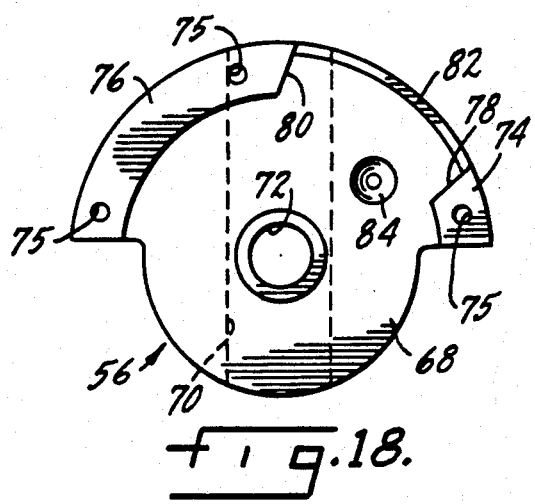
fig.18.
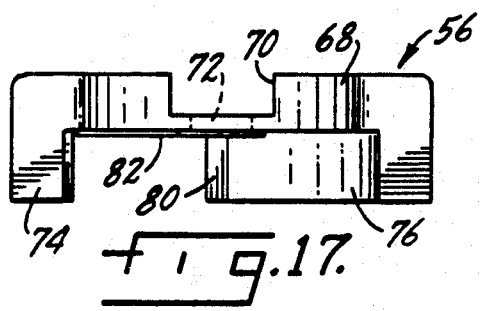
fig.17.
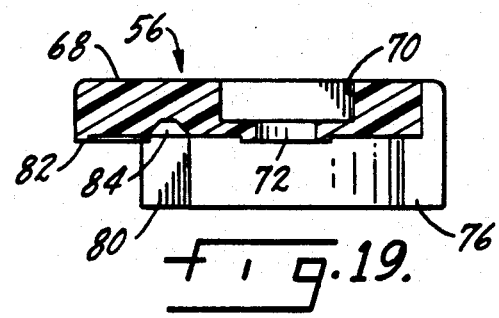
fig.19.
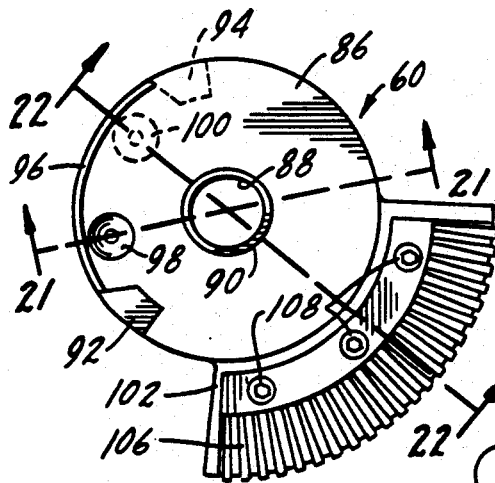
fig.20.
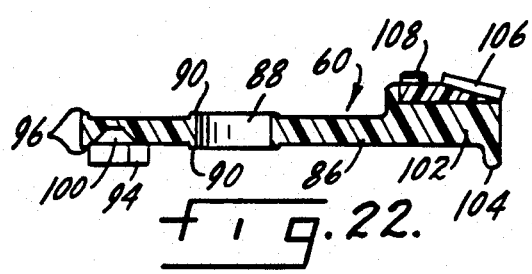
fig.22.
fig.23.
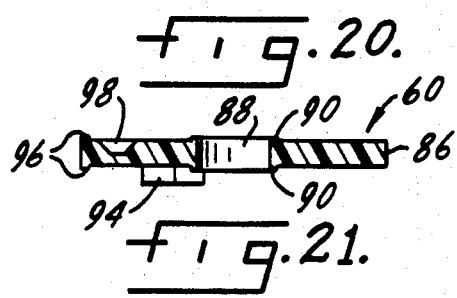
fig.21.
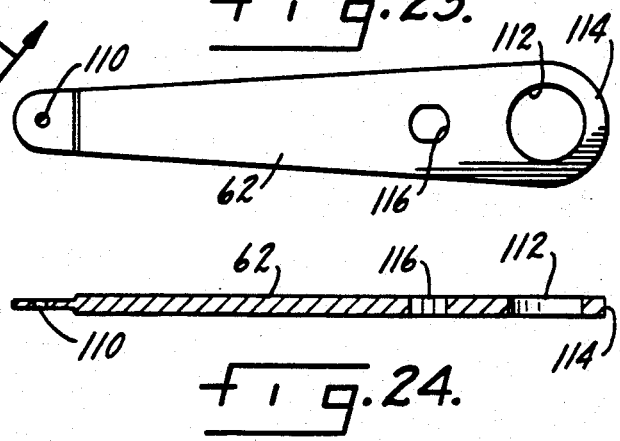
fig.24.

LOST MOTION DRIVE ASSEMBLY

BACKGROUND OF THE INVENTION

This invention relates to a lost motion drive assembly. The drive is primarily intended for controlling the louvers or doors of the air plenum in an automobile's ventilation system, although other applications are conceivable. Automobiles have an air plenum in which air is heated or cooled and then directed into the passenger compartment through air ducts or vents. These vents are commonly located on the instrument panel, near the floor, and below the windshield for defrosting it. The user selects which vents he wants air to flow from, as well as the air temperature and whether it is recirculated or mixed with outside air. To effect the desired air flow, a plurality of doors or louvers are provided in the air plenum to direct the air through passages to the appropriate vents.

Electric and pneumatic motors have been used for opening and closing the doors, as well as the more economical approach of mechanically connecting the doors to a user-actuatable selector. In the past mechanical switches have involved complicated mechanisms having many parts including cams, followers, levers and the like. The present invention is concerned with a greatly simplified structure providing a mechanical switch for setting the doors in an air plenum.

Modern automobiles provide at least five choices or modes for the air flow. The five modes are panel mode wherein air is directed through vents o the instrument panel; bi-level mode wherein air is directed through both the instrument panel vents and floor vents; floor mode wherein all air is directed through floor vents; air-mix mode wherein outside air is mixed with inside air and is directed through both floor vents and defrost ducts; and defrost mode wherein all air is directed through defrost ducts to the windshield.

One way to make a switch for setting the appropriate plenum louvers to effect each of these modes is to have a separate switch element, such as a lever, for each of the five modes. The present invention provides a switch having only two such levers.

SUMMARY OF THE INVENTION

This invention relates to a lost-motion drive assembly. The term lost-motion drive refers to a drive where at least one driven part is at times responsive to motion of a driving part and at other times does not respond to such motion. In the present invention the lost motion involves two levers, which individually respond, first one and then the other, to the rotation of a drive shaft.

A primary object of the invention is a drive assembly made from a minimum number of parts.

Another object of the invention is a drive of the type described which is relatively simple to manufacture and assemble.

Another object is a drive which locks the driven members in place when they reach a desired position.

A further object is a lost-motion drive which minimizes hysteresis effects when the drive is operated first in one direction and then in the opposite direction. Hysteresis is unintentional lost motion caused by loose-fitting drive parts which require a certain amount of reverse motion before taking up slack and beginning to move the desired parts in the opposite direction to the immediately preceding motion. Stated another way, with minimum hysteresis, the drive is always poised for immediate motion in either direction upon input from the user.

These and other objects which may become apparent are realized by a lost-motion drive assembly having a flat base member. A pivot post on the base mounts upper and lower levers for rotation. Each of the levers has a socket formed therein and the base has a base pocket formed in its top surface.

A stationary cover is mounted on the base. It has a plate surface adjacent the upper lever, the plate having a cover pocket formed therein. An actuator is disposed between the upper and lower levers. The actuator includes a segment gear. A drive shaft carries a pinion which engages the segment gear. A knob connected to the drive shaft allows the user to select the position of the drive shaft.

The actuator has upper and lower actuator pockets cut in its upper and lower surfaces, respectively. The upper actuator pocket is moveable into and out of alignment with the cover pocket and upper socket while the lower actuator pocket is moveable into and out of alignment with the base pocket and lower socket.

Upper and lower drive lugs formed on the actuator are engageable with one side edge of the upper and lower levers, respectively. A lower ball is disposed in the lower socket and is engageable with the base or lower actuator pockets when aligned therewith. An upper ball is disposed in the upper socket and is engageable with the cover or upper actuator pockets when aligned therewith.

Together the cover, pockets and balls define a clutch which will connect a leading lever to the actuator to move the leading lever from one position to another upon rotation of the actuator. Then a drive lug engages a trailing lever and moves it to a new position while the clutch holds the leading lever stationary. The procedure works the same in the reverse direction also.

BRIEF DESCRIPTION OF THE DRAWINGS

FIG. 1 is a front elevation view of the lost-motion drive assembly of the present invention.

Figure 2:
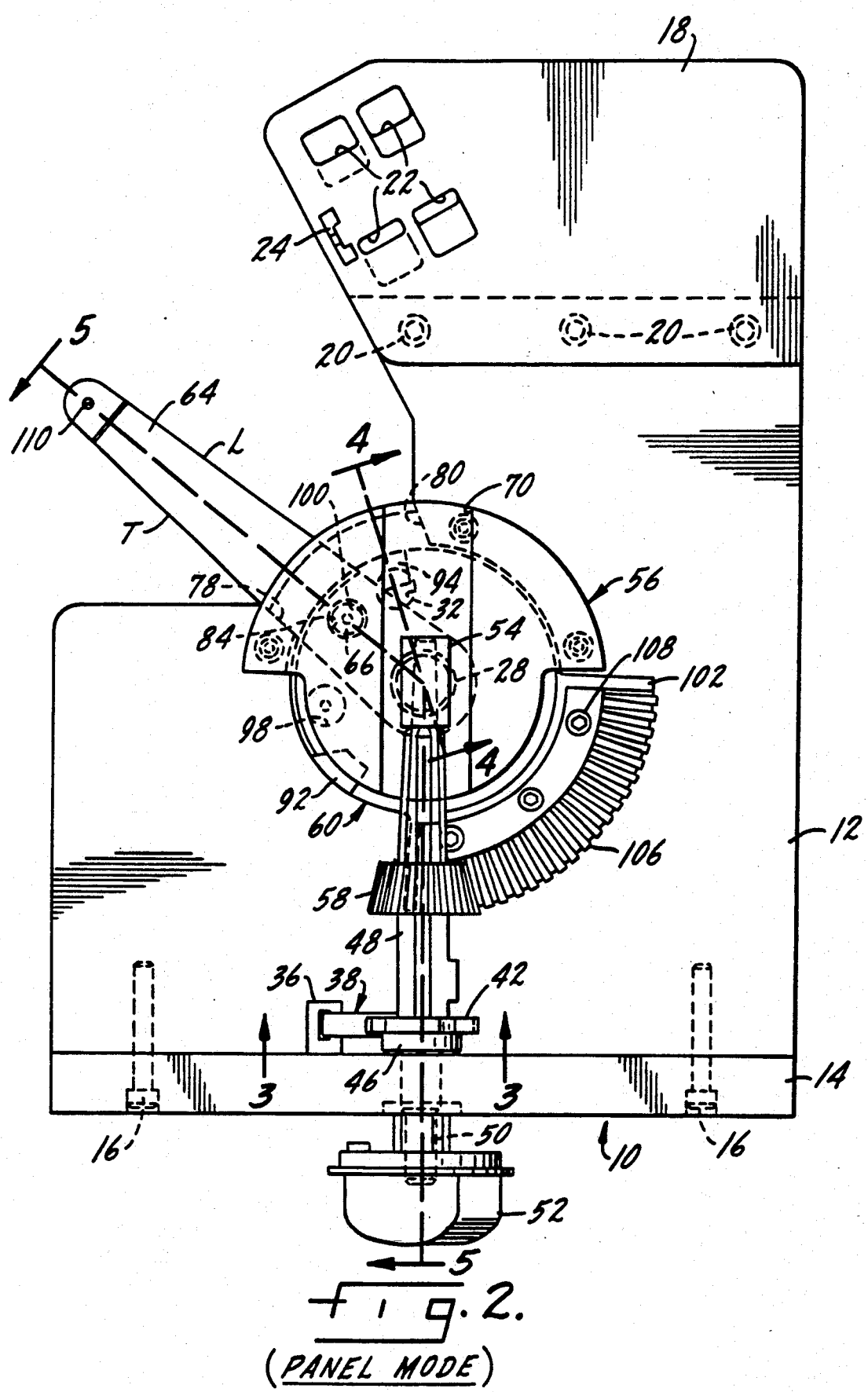

FIG. is a plan view of the drive assembly in panel mode.

FIG. 3 is a front elevation view of the detent wheel, looking along line 3—3 of FIG. 2.

FIG. 4 is a section taken along line 4—4 of FIG. 2.

FIG. 5 is a section taken along line 5—5 of FIG. 2.

FIG. 6 is a plan view of a portion of the drive assembly, showing the levers in bi-level mode.

FIG. 7 is a section taken along line 7—7 of FIG. 6.

FIG. 8 is a view similar to FIG. 6 showing the levers in floor mode.

FIG. 9 is a section taken along line 9—9 of FIG. 8.

FIG. 10 is a section taken along line 10—10 of FIG. 8.

FIG. 11 is a view similar to FIG. 6 showing the levers in air-mix mode.

FIG. 12 is a section taken along line 12—12 of FIG. 11.

FIG. 13 is a section taken along line 13—13 of FIG. 11.

FIG. 14 is a view similar to FIG. 6, showing the levers in defrost mode.

FIG. 15 is a section taken along line 15—15 of FIG. 14.

FIG. 16 is a top plan view of the cover.

FIG. 17 is a front elevation view of the cover.

FIG. 18 is a bottom plan view of the cover.

FIG. 19 is a section taken along line 19—19 of FIG. 16.

FIG. 20 is a top plan view of the actuator.

FIG. 21 is a section taken along line 21—21 of FIG. 20.

FIG. 22 is a section taken along line 22—22 of FIG. 20.

FIG. 23 is a plan view of a lever.

FIG. 24 is a section taken through the lever of FIG. 23.

DETAILED DESCRIPTION OF THE INVENTION

A lost-motion drive assembly according to the present invention is shown generally at 10 in FIGS. 1, 2 and 5. The drive serves as a mechanical switch for setting the doors or louvers of an automobile air plenum. The drive is mounted on a horizontal base plate 12. A vertical panel member 14 is connected to the front edge of the base plate by bolts 16. The front surface of the panel 14 may carry indicia, as shown in FIG. 1, indicating the various modes of operation of the air plenum. In the automotive application the drive assembly would be mounted in the car's instrument panel.

FIGS. 2-4 show further details of the base 12. An extension portion 18 connected to the main base plate 12 by bolts 20 has a plurality of openings 22 as well as an upstanding guidepost 24. The openings 22 and guidepost 24 may be used to guide or route wires or cables (not shown) connecting the driven members of the drive assembly to the doors or louvers of the air plenum. Looking at FIG. 4, the upper surface of the base plate 12 has a seat which receives the foot 26 of an upstanding pivot post 28. Opposing grooves 29 are cut into the top of the post. The post is fixed to the base plate 12 by a bolt 30 extending through a hole in the bottom of the base plate. The base plate also has a base pocket 32 formed in its upper surface. The pocket is sized to receive a ball shown at 34.

Looking at FIG. 3, the base plate 12 has a recess which receives a pedestal 36. The pedestal may be glued in the recess. A slot in the top end of the pedestal 36 receives the leg 37 of a detent spring 38. A cantilevered arm 39 of the detent spring has a hook-shaped finger 40 at its outer or free end. The finger is engageable with the circumference of a detent wheel 42. The circumference of the detent wheel has five spaced notches 44a–44e. Each notch defines one of the five selections for placement of the drive assembly. That is, when notch 44a engages the hook 40 the drive assembly is in panel mode. Notches 44b–44e similarly define the bi-level, floor, air-mix and defrost modes, respectively. A spacer 46 is disposed adjacent the detent wheel 42. As seen in FIGS. 2 and 5, the spacer abuts the inside edge of the panel member 14.

A drive shaft 48 supports the detent wheel 42 and spacer 46, as seen in FIGS. 2, 3 and 5. The front end of the drive shaft 48 is journalled in an opening through the panel 14. A stubshaft 50 at the end of shaft 48 mounts a knob 52. The knob is presented to the user allowing him to rotate the drive shaft 48 to the desired selection. The rear end of the drive shaft 48 is journalled in a bearing sleeve 54. The bearing sleeve 54 has flanges which fit in the grooves 29 of the pivot post 28. The sleeve 54 rests in a channel of a cover shown generally at 56. Details of the cover are shown and described below.

The drive shaft 48 mounts a beveled pinion 58 near the middle of the shaft. As best seen in FIG. 2, the pinion 58 has teeth which engage a segment gear formed in an actuator shown generally at 60. The actuator 60 rotates on the pivot post 28. The actuator lies between lower and upper driven members or levers 62 and 64, respectively. Details of the levers are described below, but at this point it should be pointed out that each lever has a hole or socket which receives a lower or upper ball shown in FIG. 5 at 34 and 66, respectively.

Turning now to FIGS. 16-19, details of the cover 56 are shown. The cover has a top plate 68 with a channel 70 cut in its top surface. As pointed out above the bearing sleeve 54 lies in this channel. A bore 72 in the bottom of the channel 70 allows the pivot post 28 to protrude into the channel.

The underside of the cover plate 68 has two depending, arcuate walls 74 and 76. The arcuate walls 74, 76 have bolt holes 75 which receive bolts through the base plate 12 for securing the cover to the plate. Wall 74 terminates at a stop 78 and wall 76 has a similar stop 80. The stops 78, 80 are arcuately spaced to define a gap between them through which the levers extend. A small lip 82 extends around the periphery of the gap, on the underside of the plate, connecting the stops 78 and 80. A cover ball pocket 84 is formed in the underside of the plate 68.

Turning now to FIGS. 20-22, details of the actuator 60 are shown. The actuator has a disk-shaped body portion 86 with a central bore 88 which receives the pivot post. The bore is surrounded at both ends by a slight boss 90. An upper drive lug 92 is formed on the upper surface of the body 86. Similarly, a lower drive lug 94 depends from the underside of the body. Lips 96 extend along the periphery of the body 86 between the locations of the drive lugs, as best seen in FIG. 20. The lips 96 and bosses 90 provide bearing surfaces on which the upper and lower levers ride.

The other major feature of the actuator body 86 is a pair of ball pockets including an upper actuator pocket 98 and a lower actuator pocket 100, formed on the top and bottom surfaces of the body, respectively. Note the beveled edges of all of the ball pockets 32, 84, 98 and 100. This shape facilitates movement of a ball into and out of the pocket while also allowing retention of a ball in the pocket when circumstances so require.

The actuator 60 also has a segment gear formed along a portion of its periphery. The segment gear includes an extension portion 102 integrally formed with the disk-shaped body portion 86. The underside of the extension 102 carries an arcuate foot 104. The upper surface of the extension has an arcuate bevel gear set 106 fastened thereto by screws 108. While it is convenient to form the gear set separately from the actuator, it will be understood that the gears may be integrally formed in the extension portion 102. As best seen in FIG. 5, the bevel gear set engages the pinion 58 with the foot 104 riding on the upper surface of the base plate 12. Rotation of the drive shaft 48 and pinion 58 causes rotation of the actuator 60 about the pivot post 28. In the illustrated embodiment the gear ratio is about 3.14 to 1.

FIGS. 23 and 24 show details of the lower lever 62. The upper lever 64 is identical. Each has an elongated arm with an eyelet 110 formed in one end and a mounting hole 112 at the other end. The eyelet 110 may be used to secure a cable which is also connected to a louver or door. The mounting hole 112 fits down over the pivot post and defines a hub 114. The hubs of the two levers contact the bosses 90 while central portions of the levers engage the lips 96 of the actuator. The upper lever 64 also engages the lip 82 on the underside of the cover. The lower lever 62 engages a similar lip formed on the base plate 12. Each lever has a ball-receiving socket therein. The lower socket is shown in FIGS. 23 and 24 at 116. The upper lever socket is shown at 118 at FIG. 5.

The use, operation and function of the invention are as follows. FIGS. 2 and 5 show the drive assembly in the panel mode which for purposes of description may be thought of as a beginning or first position or selection. The defrost mode may be considered a second or ending position. Obviously, there are three intermediate selections. Movement of the selector knob from panel mode toward defrost mode will be referred to as forward movement. Movement in the opposite direction will be called reverse movement. Reference will also be made to leading and trailing levers or edges It will be understood that leading or trailing refers to a particular direction or sequence of movement and these may be reversed, depending on the direction. In other words, what was once leading may become trailing upon reversal.

Several things should be pointed out about the panel mode. Both levers are in the same rotational position, both abutting the stop 78. The leading edge of the lower lever (schematically indicated at L in FIG. 2) is engaged by the lower drive lug 94 while the trailing edge T of the upper lever 64 is spaced from the upper drive lug 92. The upper lever is held in position by engagement of ball 66 with the cover pocket 84 (FIG. 5). Ball 66 is held in pocket 84 by the upper surface of actuator body portion 86. The lower lever, in contrast, is poised for movement in a clockwise direction by virtue of the engagement of lower ball 34 in the lower actuator pocket 100 (FIG. 5). The base plate 12 holds ball 34 in pocket 100.

When a user rotates the knob 52 from the panel position toward the bi-level position, the following actions occur. The drive shaft rotates the detent wheel, disengaging the hook 40 of the detent spring from notch 44a. The hook then rides on the outer periphery of the wheel 42. The drive shaft 48 also rotates pinion 58 which in turn causes the segment gear of the actuator 60 to rotate in a clockwise direction, as seen in FIG. 2. The upper lever is held fixed by the upper ball's engagement with the stationary cover pocket. However, engagement of lower ball 34 with the lower actuator pocket 100 and the lower lever socket causes the lower lever to rotate with the actuator in a clockwise direction. During rotation of the actuator, the upper and lower balls rotate or slip on the flat surface of either the actuator, the base or the cover, whichever flat surface it happens to be contacting at the time. In the case of the movement from panel mode to bi-level mode the lower ball 34 rotates on the flat upper surface of the base plate while the upper ball 66 rotates on the flat upper surface of the actuator.

The bi-level position or selection is defined by notch 44b on the detent wheel 42. Engagement of detent spring 38 with any notch provides tactile feedback to the user indicating the arrival at a given selection. Upon arrival at the bi-level selection, the drive assembly has the configuration shown in FIGS. 6 and 7. Here it will be noted that the segment gear has rotated somewhat relative to the cover and base, carrying the actuator pockets 98 and 100 closer to the cover and base pockets 84 and 32, respectively. Otherwise, the relationship between the balls and the pockets has not changed. The upper ball is still held in the upper cover pocket and the lower ball is still engaged with the lower actuator pocket so that the lower lever 62 will continue to move with the actuator. Thus, if the user continues to move the knob in the same direction, i.e., toward floor mode, the lower lever 62 will continue to move with the actuator toward the floor mode position or selection.

It should be pointed out that the leading edge of the lower lever continues to be in contact with the lower drive lug 94. Thus, the lower lever is poised for reverse movement at all times during its forward movement. If the user reverses the direction of rotation from bi-level mode back to panel mode, the lower lever would be immediately be driven in a counterclockwise direction by virtue of engagement of the lower drive lug 94 with the lower lever.

Continuing with motion in the forward direction, actuation by the user from bi-level to floor mode causes the assembly to take up the conditions shown in FIGS. 8–10. Shortly before the detent spring engages notch 44c (on the order of 10°), the leading edge of lower lever 62 hits up against the stop surface 80 and the lower ball socket 116 of the lower lever becomes aligned with the base pocket 32. This stops movement of the lever but since the user hasn't yet noticed the tactile feedback from the detent wheel, he will continue rotating the knob (and therefore the drive shaft, pinion, segment gear and actuator), moving the actuator an additional 10°. This over-travel of the actuator drives the lower ball out of actuator pocket 100 and into the base pocket 32. When notch 44c is finally reached, the pocket 100 will be somewhat past the pocket 32 and ball 34 will be held fixed in the base pocket by the flat 20 underside of the actuator.

When the floor position detent 44c is reached, the upper drive lug 92 is brought within 10° of engagement with the trailing edge T of the upper lever 64. Similarly, the upper actuator pocket will be 10° from aligning with the cover pocket. When the user continues moving the knob from floor mode to air-mix mode (and from notch 44c toward notch 44d), there will be a slight delay until the drive lug 92 contacts the upper lever and begins to rotate it in a clockwise direction. As the lug begins to move the lever, the upper actuator pocket 98 is aligned with the cover pocket 84. Movement of the upper lever drives the upper ball 66 out of the cover pocket and into the upper actuator pocket. During this motion the lower lever 62 is held fixed against the stop 80 by the lower ball's engagement with the base pocket.

When the air-mix mode selection is reached (i.e., notch 44d is engaged by the detent spring), the drive assembly has the configuration of FIGS. 11–13. In this condition, the upper ball 66 engages the upper actuator pocket 98 and the lower ball 34 remains fixed in the base pocket 32. It should be mentioned again that in the event the user reverses the direction from air-mix back to floor mode, the upper lever becomes the leading lever and will be immediately moved by engagement of the actuator and upper lever due to upper ball 66 being locked in upper actuator pocket 98. That is, the upper lever is moved from floor mode to air-mix mode by the drive lug 92 but it is moved in the other direction by the ball engagement with the actuator.

Continuing with movement from air-mix to defrost mode, the drive lug 92 pushes the lever 64 up against the stop 80, with the parts taking the positions shown in FIGS. 14 and 15. Once again it is pointed out that lower lever 62 is held fixed in the one direction by stop 80 and in the other direction by engagement of lower ball 34 in lower pocket 32. The upper lever 64 is held fixed between the stop 80 and engagement of the upper ball 66 in actuator pocket 98. That same engagement has the upper lever immediately prepared for movement in the reverse direction, i.e., from the defrost position back to the floor mode and from there to the panel mode.

As is the case with the leading lower lever in the forward direction, the upper lever 64 leads in reverse and hits the stop 78 10° before the detent spring engages the floor mode notch 44c. The resulting actuator overtravel forces the upper ball 66 out of the upper actuator pocket and into the cover pocket 84. This fixes the upper lever in position. At the same time, the lower drive lug 94 is 10° away from the lower lever 62. So the lower lever remains fixed.

When the user continues reverse movement toward bi-level mode the lower lug 94 will (after the 10° delay) engage the trailing edge of the lower lever and push the lever counterclockwise, away from the stop 80 and toward the stop 78. At the same time alignment of lower actuator pocket 100 with base pocket 32 permits the lower ball to be driven out of the base pocket and into the lower actuato pocket. This conditions the lower lever for immediate clockwise movement, should the user change rotation of the knob back to the forward direction.

The overtravel feature is important because it prevents any looseness or slop in the positions of the levers at the floor mode. This is because both balls are held fixed in a stationary pocket at the floor mode. Alignment of the stationary and actuator pockets occurs only between the detent wheel notches, presumably when the drive shaft is in motion. Thus, transference of the balls between the pockets is controlled by the movement of the lever by the drive lugs. This eliminates hysteresis in the alternate motions of the drive assembly in the forward and reverse directions.

Another important feature of the drive assembly is the fact that the drive levers are consistently held fixed in both directions. That is, the levers are always in contact with elements preventing unwanted sloppiness. That is, the stationary member is engaged in one direction by a stop and in the other by a ball contacting a stationary pocket. The moving member is engaged in one direction by a ball carried with the actuator and in the other direction by a drive lug.

Together the ball pockets and balls form a clutch means releasably engageable between the actuator and levers for driving the lower lever from a first position to a second position. The clutch means also drives the upper lever from the second to the first position. Lost motion occurs when the clutch holds one lever fixed while the other one is moving.

An alternate embodiment is contemplated having no overtravel so no lever lag is evident. This can be achieved by altering the gear ratio to 4.1:1 and adjusting the pocket positions on the actuator so there is no 10° overtravel. This system has no overtravel so no lever lag is evident. However, slight lever hysteresis is experienced in the floor mode. In the embodiment having hysteresis but no lever lag may be preferable to the embodiment having slight lever lag with no hysteresis. Both systems work. It is a matter of preference as to which way to go.

Whereas a preferred form of the invention has been shown and described, it will be realized that alterations may be made thereto without departing from the scope of the following claims.

I claim:

1. A lost-motion drive assembly, comprising:
   a base having first and second driven members mounted thereon for independent movement between at least first and second positions;
   an actuator mounted on the base adjacent the first and second driven members and selectively positionable by a user;
   clutch means releasably engageable between the actuator and driven members for actively driving the first driven member from one position to the other, and for actively driving the second driven member from said other position to said one position; and
   first and second drive lugs formed on the actuator and respectively positively engageable with the first driven member for driving the first driven member from said other position to said one position and for driving the second driven member from said one position to said other position.

2. The structure of claim 1 wherein the clutch means comprises:
   a base pocket formed in the base;
   a lower socket formed in the first driven member and an upper socket formed in the second driven member;
   a stationary cover having a top surface mounted adjacent the second driven member, the top surface having a cover pocket formed therein;
   an upper and a lower actuator pocket formed in upper and lower surfaces of the actuator, respectively, with the upper actuator pocket being moveable into and out of alignment with the cover pocket and upper socket and the lower actuator pocket being moveable into and out of alignment with the base pocket and lower socket; and
   a lower ball disposed in the lower socket and engageable with the base or lower actuator pockets when aligned therewith and an upper ball disposed in the upper socket and engageable with the cover or upper actuator pockets when aligned therewith.

3. A lost-motion drive assembly, comprising:
   a base;
   first and second driven members mounted on the base for independent movement between at least beginning and ending positions;
   an actuator disposed between the first and second driven members where the actuator is selectively positionable by a user between at least first, second and third selections, the first selection defined by both driven members being in their beginning positions, the second selection defined by the first driven member being in its ending position while the second driven member is in its beginning position, the third selection defined by both driven members being in their ending positions;
   clutch means releasably engageable between the actuator and driven members for actively driving the first driven member from its beginning to its ending position when the actuator is moved from the first to the second selection, the clutch means releasing the first driven member when the actuator is moved between the second and third selections, and for actively driving the second driven member from its ending to its beginning position when the actuator is moved from the third to the second selection, the clutch means releasing the second driven member when the actuator is moved between the first and second selections;

a first drive lug formed on the actuator and positively engageable with the first driven member for driving the first driven member from its ending position to its beginning position when the actuator is moved from the second to the first selection; and a second drive lug formed on the actuator and positively engageable with the second driven member for driving the second driven member from its beginning to its ending position when the actuator is moved from the second to the third selection.

4. The structure of claim 3 wherein the clutch means comprises:

a base pocket formed in the base;

a lower socket formed in the first driven member and an upper socket formed in the second driven member;

a stationary cover having a top surface mounted adjacent the second driven member, the top surface having a cover pocket formed therein;

an upper and a lower actuator pocket formed in upper and lower surfaces of the actuator, respectively, with the upper actuator pocket being moveable into and out of alignment with the cover pocket and upper socket and the lower actuator pocket being moveable into and out of alignment with the base pocket and lower socket; and a lower ball disposed in the lower socket and engageable with the base or lower actuator pockets when aligned therewith and an upper ball disposed in the upper socket and engageable with the cover or upper actuator pockets when aligned therewith.

5. The structure of claim 3 further characterized in that the driven members and actuator are mounted for rotation.

6. A lost-motion drive assembly, comprising:

a base having a base pocket formed therein;

upper and lower driven members mounted for movement on the base, the driven members each having a socket formed therein;

a stationary cover having a top surface mounted adjacent the upper driven member, the top surface having a cover pocket formed therein;

an actuator disposed between the upper and lower driven members, the actuator having upper and lower surfaces adjacent said driven members with an upper and a lower actuator pocket formed in the upper and lower surfaces respectively, the actuator being selectively positionable by a user, with the upper actuator pocket being moveable into and out of alignment with the cover pocket and upper socket and the lower actuator pocket being moveable into and out of alignment with the base pocket and lower socket;

upper and lower drive lugs formed on the actuator and engageable with the upper and lower driven members respectively; and a lower ball disposed in the lower socket and engageable with the base or lower actuator pockets when aligned therewith and an upper ball disposed in the upper socket and engageable with the cover or upper actuator pockets when aligned therewith.

7. The structure of claim 6 wherein the driven members are movable between at least beginning and ending positions and the actuator is selectively positionable by the use between at least first, second and third selections, the first selection defined by both driven members being in their beginning positions, the second selection defined by the first driven member being in its ending position while the second driven member is in its beginning position, the third selection defined by both driven members being in their ending positions.

8. The structure of claim 7 further characterized in that when the actuator is in the first selection the cover pocket and upper socket are aligned, and the lower actuator pocket and lower socket are aligned.

9. The structure of claim 8 further characterized in that when the actuator is in the second selection the cover pocket and upper socket are aligned, and the base pocket and lower socket are aligned.

10. The structure of claim 9 further characterized in that when the actuator is in the third selection the upper actuator pocket and upper socket are aligned, and the base pocket and lower socket are aligned.

11. The structure of claim 6 further comprising a pivot post attached to the base and further characterized in that the driven members and actuator are mounted for rotation about the pivot post.

12. The structure of claim 11 further comprising a segment gear attached to the actuator, and a user-positionable drive shaft carrying a pinion engaging the segment gear.

13. The structure of claim 12 further comprising a detent wheel mounted on the drive shaft and having a plurality of detents, and a detent spring engageable with said detents to define desired positions of the assembly.

14. The structure of claim 12 wherein the segment gear includes an arcuate foot engaging the base.

15. The structure of claim 12 further comprising a panel member attached to the base, and a bearing sleeve attached to the cover, the drive shaft being mounted for rotation in the panel and bearing sleeve.

16. The structure of claim 6 wherein the driven members are movable between at least beginning, intermediate and ending positions and the actuator is selectively positionable by the user between at least five selections.

17. The structure of claim 6 wherein the cover includes first and second arcuate walls defining an arcuate open space bounded by stops, the driven members being disposed in the open space and movable between the stops.

18. The structure of claim 17 wherein the first and second arcuate walls are mounted on the base.

19. A lost-motion drive assembly, comprising:

a base having first and second driven members mounted thereon for independent movement in forward or reverse directions;

a user-positionable actuator mounted on the base for movement in forward or reverse directions;

clutch means responsive to movement of said actuator in one direction for engaging and moving only a leading one of said driven members from a first position to a second position, the clutch means comprising first and second balls carried in sockets formed in the first and second driven members, and first and second pockets formed in the actuator, said balls being engageable with the pockets to releasably connect the driven members for movement with the actuator;

drive means responsive to continued movement of said actuator in said one direction for engaging and moving only a trailing other of said driven members from a first position to a second position.

20. The structure of claim 19 wherein the clutch means holds said leading driven member in its second position during said continued movement.

21. The structure of claim 19 wherein the clutch means is arranged such that the leading driven member in one direction of actuator movement becomes the trailing driven member in the other direction of actuator movement.

22. The structure of claim 19 further comprising:
- a cover attached to the base and having a cover pocket therein which is aligned with the socket of the trailing other of said driven members when said trailing other driven member is in its first position; and
- a base pocket formed in the base which is aligned with the socket of the leading one of said driven members when said leading one driven member is in its second position.

23. The structure of claim 22 wherein the actuator, base and cover pockets are located relative to each other such that just after the leading driven member reaches its second position the actuator drives the leading driven member's ball out of an actuator pocket and into one of the base or cover pocket.

24. The structure of claim 22 wherein the actuator, base and cover pockets are located relative to each other such that just after the drive means begins to move the trailing driven member toward its second position an actuator pocket aligns with the trailing driven member's ball which is driven out of one of the base or cover pocket and into an actuator pocket.

* * * * *